US012467804B2

(12) United States Patent
Haynes et al.

(10) Patent No.: US 12,467,804 B2
(45) Date of Patent: Nov. 11, 2025

(54) ELASTOMERIC STRAIN GAUGE LOAD SENSORS

(71) Applicant: Textron Innovations Inc., Providence, RI (US)

(72) Inventors: David Frank Haynes, Arlington, TX (US); Philip Reese Boyer, Colleyville, TX (US)

(73) Assignee: Textron Innovations Inc., Providence, RI (US)

( * ) Notice: Subject to any disclaimer, the term of this patent is extended or adjusted under 35 U.S.C. 154(b) by 286 days.

(21) Appl. No.: 18/234,547

(22) Filed: Aug. 16, 2023

(65) Prior Publication Data

US 2023/0392999 A1 Dec. 7, 2023

Related U.S. Application Data

(63) Continuation-in-part of application No. 17/978,904, filed on Nov. 1, 2022, now Pat. No. 12,043,373.

(60) Provisional application No. 63/275,032, filed on Nov. 3, 2021.

(51) Int. Cl.
*G01L 1/22* (2006.01)

(52) U.S. Cl.
CPC .......... *G01L 1/2231* (2013.01); *G01L 1/2287* (2013.01)

(58) Field of Classification Search
CPC ............................ G01L 1/2231; G01L 1/2287
USPC ................................................... 73/862.627
See application file for complete search history.

(56) References Cited

U.S. PATENT DOCUMENTS

| | | | |
|---|---|---|---|
| 3,874,229 A * | 4/1975 | Ormond ................. | G01G 19/10 73/862.581 |
| 5,205,514 A | 4/1993 | Patzig et al. | |
| 8,055,396 B2 | 11/2011 | Yates et al. | |
| 8,359,932 B2 * | 1/2013 | Eriksen ................... | G01L 1/142 73/780 |
| 10,266,249 B2 | 4/2019 | Shue | |
| 10,899,435 B2 | 1/2021 | Baird | |
| 2002/0157477 A1 * | 10/2002 | Hanson .................. | G01L 1/162 73/788 |
| 2009/0178488 A1 * | 7/2009 | Kuzdrall ................. | G01J 5/061 73/849 |

* cited by examiner

*Primary Examiner* — Nathaniel T Woodward
(74) *Attorney, Agent, or Firm* — Lawrence Youst PLLC (57) ABSTRACT

A load sensor includes a compressible body positionable between two surfaces. The compressible body has a plurality of aligned layers including first and second outer shims with a middle shim positioned therebetween and with a resilient material interposed between each adjacent shim. The second outer shim has a gap that exposes an unsupported area of the middle shim. A strain gauge is coupled to the middle shim in the unsupported area. When the compressible body is uncompressed, the resilient material interposed between the first outer shim and the middle shim has a substantially uniform thickness. When the compressible body is compressed between the two surfaces, the resilient material aligned with the unsupported area and interposed between the first outer shim and the middle shim has a nonuniform thickness such that the middle shim deflects away from the first outer shim in the unsupported area, thereby deforming the strain gauge.

20 Claims, 9 Drawing Sheets

ELASTOMERIC STRAIN GAUGE LOAD SENSORS

CROSS-REFERENCE TO RELATED APPLICATIONS

The present application is a continuation-in-part of co-pending application Ser. No. 17/978,904 filed Nov. 1, 2022, which claims the benefit of U.S. Provisional Application No. 63/275,032 filed Nov. 3, 2021, the entire contents of each are hereby incorporated by reference.

GOVERNMENT RIGHTS

This invention was made with U.S. Government support under Agreement No. W9124P-19-9-0001 awarded by the Army Contracting Command-Redstone Arsenal to the AMTC and a related AMTC Project Agreement 19-08-006 with Bell Textron Inc. The Government has certain rights in the invention.

TECHNICAL FIELD OF THE DISCLOSURE

The present disclosure relates, in general, to strain gauge load sensors that convert mechanical forces into measurable electrical signals and, in particular, to elastomeric strain gauge load sensors configured to convert compressive forces into proportional electrical signals in high load and/or limited space applications.

BACKGROUND

Vertical takeoff and landing (VTOL) aircraft are capable of taking off and landing without the need for a runway. One example of a VTOL aircraft is a helicopter which is a rotorcraft having one or more rotors that provide lift and thrust to the aircraft. The rotors not only enable hovering and vertical takeoff and landing, but also enable forward, backward and lateral flight. These attributes make helicopters highly versatile for use in congested, isolated or remote areas. Another example of a VTOL aircraft is a tiltrotor aircraft that includes a set of proprotors that can change their plane of rotation based on the operation being performed. Tiltrotor aircraft generate lift and forward propulsion using the proprotors that are typically coupled to nacelles mounted near the ends of a fixed wing. The nacelles rotate relative to the fixed wing such that the proprotors have a generally horizontal plane of rotation in a VTOL flight mode and a generally vertical plane of rotation while cruising in a forward flight mode, wherein the fixed wing provides lift and the proprotors provide forward thrust.

In modern fly-by-wire VTOL aircraft, the control logic used by the automatic flight control system may vary depending upon the mission and/or the maneuver being performed. For example, the control logic used during flight may be different from the control logic used when the aircraft is on the ground. Consequently, it is important for the automatic flight control system to know whether the aircraft is in the air or on the ground including when the aircraft transitions from the air to the ground during a landing maneuver. Attempts have been made to use various weight on wheel sensors, such as limit switches or proximity switches, to determine when the air-to-ground transition has taken place. It has been found, however, that conventional weight on wheel sensors require significant displacement of components within the landing gear to obtain an on-the-ground indication which results in an undesirable delay in switching from the in-the-air control logic to the on-the-ground control logic. Accordingly, a need has arisen for an improved detection system that provides an early indication of when the aircraft has transitioned from air to ground during a landing maneuver.

SUMMARY

In a first aspect, the present disclosure is directed to a load sensor for measuring compressive forces between two surfaces. The load sensor includes a compressible body positionable between the two surfaces. The compressible body has a plurality of aligned layers including first and second outer shims with a middle shim positioned therebetween and with a resilient material interposed between each adjacent shim. The second outer shim has a gap that exposes an unsupported area of the middle shim. A strain gauge is coupled to the middle shim in the unsupported area. When the compressible body is in an uncompressed state, the resilient material interposed between the first outer shim and the middle shim has a substantially uniform thickness. When the compressible body is in a compressed state between the two surfaces, the resilient material aligned with the unsupported area and interposed between the first outer shim and the middle shim has a nonuniform thickness such that the middle shim deflects away from the first outer shim in the unsupported area, thereby deforming the strain gauge.

In some embodiments, the two surfaces may be substantially parallel and planar surfaces. In certain embodiments, the compressible body may be an annular body, an arcuate body or a linear body. In some embodiments, each of the shims may be substantially noncompressible such as metallic shim. In certain embodiments, the resilient material may be a compressible material such as an elastomeric material. In some embodiments, the gap may have a gap width and the compressible body may have a body thickness in the uncompressed state such that the gap width is greater than the body thickness. For example, a ratio of the gap width to the body thickness may be between 1 to 1 and 4 to 1. In certain embodiments, each of the shims may have a common thickness. In other embodiments, a thickness of the middle shim may be different from a thickness of the first and second outer shims such as the thickness of the middle shim being less than the thickness of the first and second outer shims. In some embodiments, each of the shims may have a shim thickness and the resilient material interposed between each adjacent shim may have a resilient material thickness in the uncompressed state such that the resilient material thickness is greater than the shim thickness. For example, a ratio of the resilient material thickness to the shim thickness may be between 2 to 1 and 3 to 1.

In a second aspect, the present disclosure is directed to a load sensor for measuring compressive forces between two surfaces. The load sensor includes a compressible annular body positionable between the two surfaces. The compressible annular body has a plurality of aligned layers including first and second outer metallic shims with a middle metallic shim positioned therebetween and with an elastomeric material interposed between each adjacent shim. The second outer metallic shim has a gap that exposes an unsupported area of the middle metallic shim. A strain gauge is coupled to the middle metallic shim in the unsupported area. When the compressible annular body is in an uncompressed state, the elastomeric material interposed between the first outer metallic shim and the middle metallic shim has a substantially uniform thickness. When the compressible annular body is in a compressed state between the two surfaces, the elastomeric material aligned with the unsupported area and interposed between the first outer metallic shim and the middle metallic shim has a nonuniform thickness such that the middle metallic shim deflects away from the first outer metallic shim in the unsupported area, thereby deforming the strain gauge.

In a third aspect, the present disclosure is directed to a load sensor for measuring compressive forces between two surfaces. The load sensor includes a compressible annular body positionable between the two surfaces. The compressible annular body has a plurality of aligned layers including first and second outer metallic shims with a middle metallic shim positioned therebetween and with an elastomeric material interposed between each adjacent shim. The second outer metallic shim has a plurality of gaps that expose a plurality of unsupported areas of the middle metallic shim. Each of a plurality of strain gauges is coupled to the middle metallic shim in one of the unsupported areas. When the compressible annular body is in an uncompressed state, the elastomeric material interposed between the first outer metallic shim and the middle metallic shim has a substantially uniform thickness. When the compressible annular body is in a compressed state between the two surfaces, the elastomeric material aligned with each of the unsupported areas and interposed between the first outer metallic shim and the middle metallic shim has a nonuniform thickness such that the middle metallic shim deflects away from the first outer metallic shim in the unsupported areas, thereby deforming the strain gauges.

In some embodiments, the plurality of unsupported areas may be three unsupported areas and the plurality of strain gauges may be three strain gauges. In such embodiments, the strain gauges may be uniformly distributed about the compressible annular body at approximately 120 degree intervals.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which.

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, not all features of an actual implementation may be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1A:
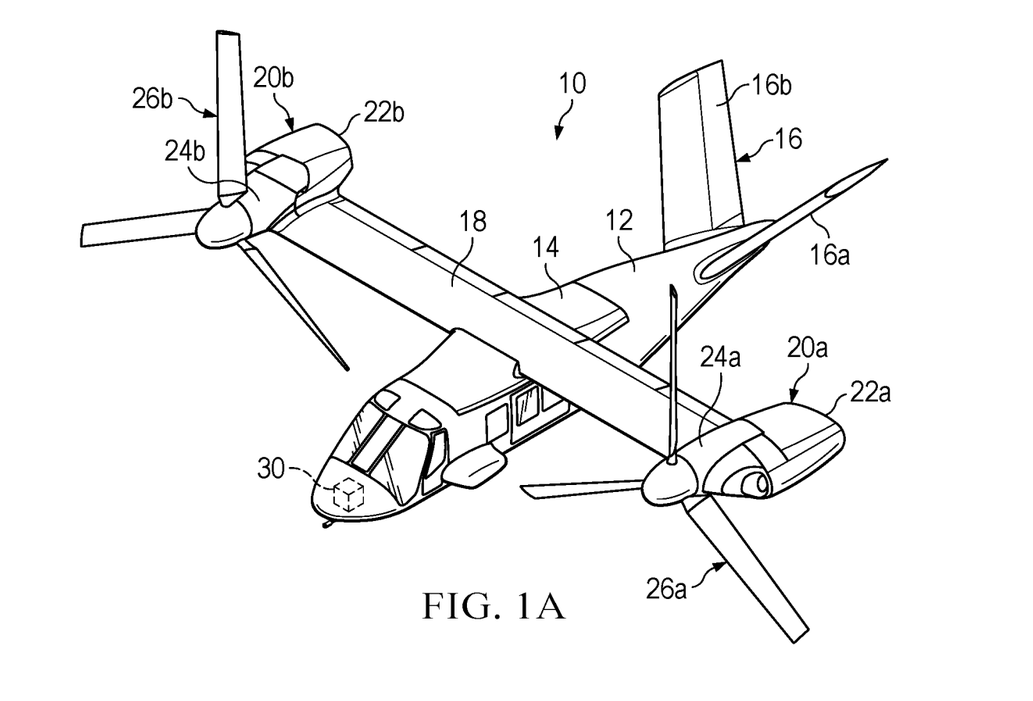
FIGS. 1A-1B are schematic illustrations of a tiltrotor aircraft having landing gear with an on-the-ground detection system including a strain gauge load sensor in accordance with embodiments of the present disclosure.
Figure 1B:
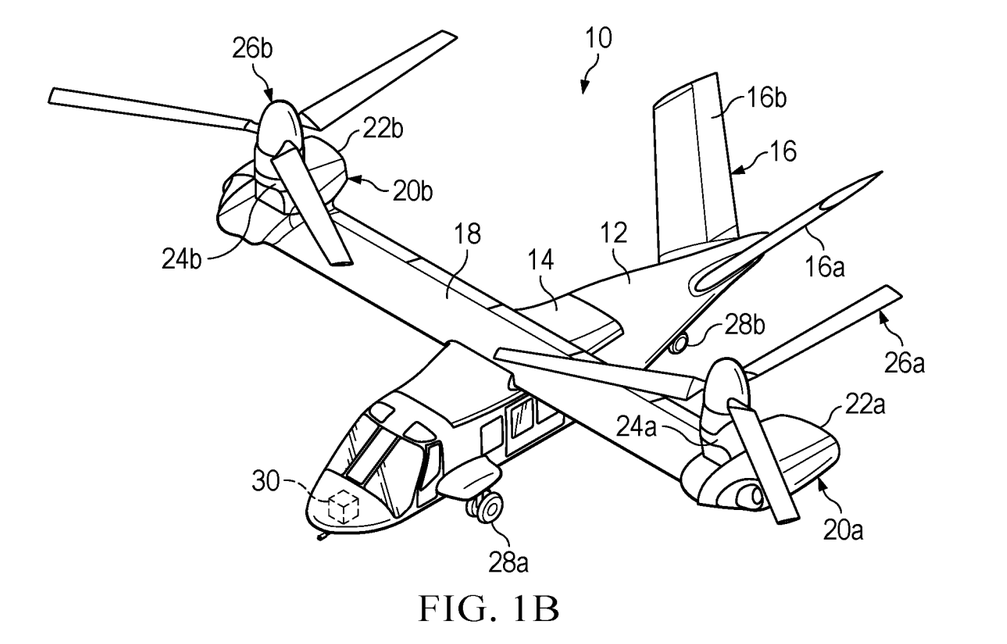

Referring to FIGS. 1A-1B in the drawings, a rotorcraft depicted as a tiltrotor aircraft is schematically illustrated and generally designated 10. Aircraft 10 includes a fuselage 12, a wing mount assembly 14 and a tail assembly 16 including tail members 16a, 16b having control surfaces operable for horizontal and/or vertical stabilization during forward flight. A wing member 18 is supported by wing mount assembly 14. Located at outboard ends of wing member 18 are propulsion assemblies 20a, 20b. Propulsion assembly 20a includes a nacelle depicted as fixed pylon 22a that houses an engine and transmission. In addition, propulsion assembly 20a includes a mast assembly 24a that is rotatable relative to fixed pylon 22a between a generally horizontal orientation, as best seen in FIG. 1A, a generally vertical orientation, as best seen in FIG. 1B. Propulsion assembly 20a also includes a proprotor assembly 26a that is rotatable relative to mast assembly 24a responsive to torque and rotational energy provided via a drive system mechanically coupled to the engine and transmission. Likewise, propulsion assembly 20b includes a nacelle depicted as fixed pylon 22b that houses an engine and transmission, a mast assembly 24b that is rotatable relative to fixed pylon 22b and a proprotor assembly 26b that is rotatable relative to mast assembly 24b responsive to torque and rotational energy provided via a drive system mechanically coupled to the engine and transmission.

Aircraft 10 includes a landing gear system including a pair of forward landing gear 28a and an aft landing gear 28b each including an on-the-ground detection system having a strain gauge load sensor of the present disclosure. Each of the on-the-ground detection systems is preferably linked to a flight control system 30 that executes control logic to provide commands to operate the fly-by-wire control system of aircraft 10. As the control logic used during flight is different from the control logic used when aircraft 10 is on the ground, the on-the-ground detection systems incorporated into landing gear 28a, 28b provide an early indication of when aircraft 10 has transitioned from the air to the ground during landing maneuvers such that the proper control logic is executed by flight control system 30. Each of forward landing gear 28a and aft landing gear 28b is coupled to fuselage 12 and is rotatable relative thereto such that forward landing gear 28a and aft landing gear 28b can be retracted into fuselage 12 during flight, as best seen in FIG. 1A.

FIG. 1A illustrates aircraft 10 in airplane or forward flight mode, in which proprotor assemblies 26a, 26b are rotating in a substantially vertical plane to provide a forward thrust enabling wing member 18 to provide a lifting force responsive to forward airspeed, such that aircraft 10 flies much like a conventional propeller driven aircraft. FIG. 1B illustrates aircraft 10 in helicopter or VTOL flight mode, in which proprotor assemblies 26a, 26b are rotating in a substantially horizontal plane to provide a lifting thrust, such that aircraft 10 flies much like a conventional helicopter. It should be appreciated that aircraft 10 can be operated such that proprotor assemblies 26a, 26b are selectively positioned between forward flight mode and VTOL flight mode, which can be referred to as a conversion flight mode.

Figure 2A:
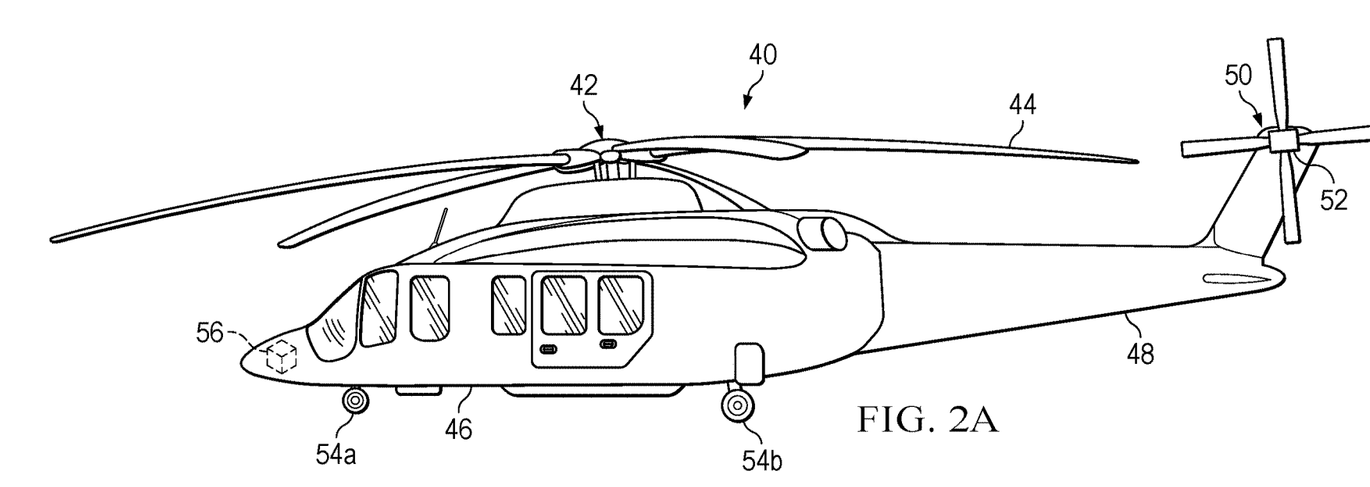
FIGS. 2A-2B are schematic illustrations of a helicopter having landing gear with an on-the-ground detection system including a strain gauge load sensor in accordance with embodiments of the present disclosure.
Figure 2B:
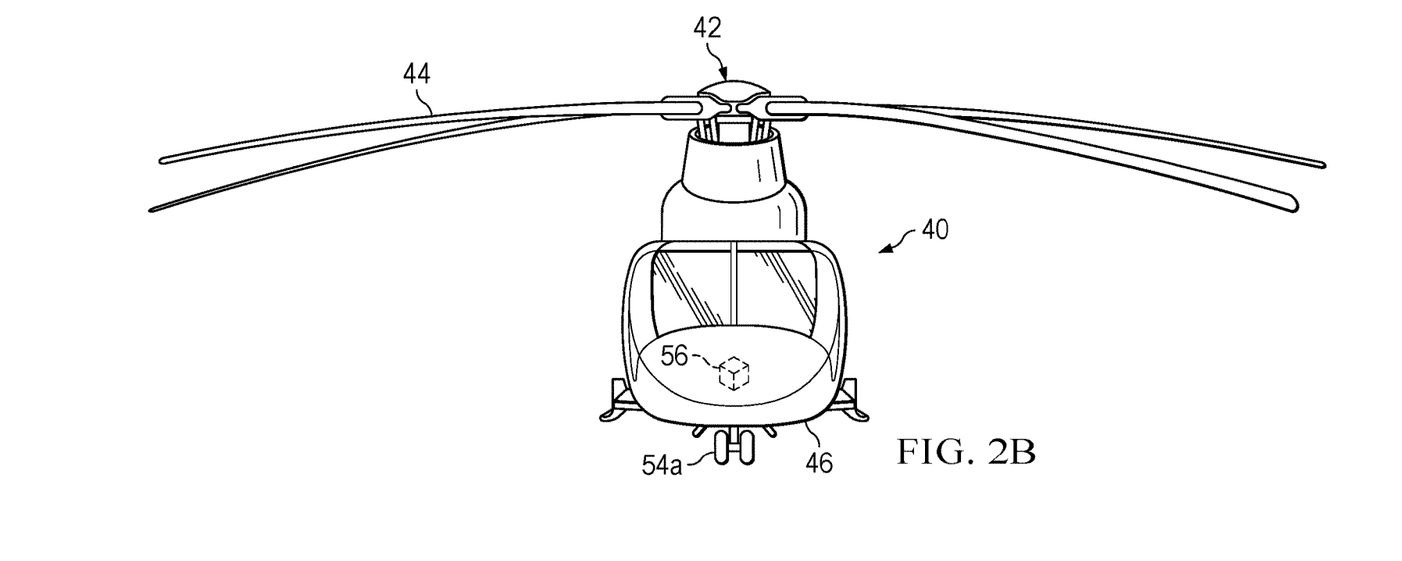

Referring to FIGS. 2A-2B in the drawings, a rotorcraft depicted as a helicopter is schematically illustrated and generally designated 40. The primary propulsion assembly of helicopter 40 is a main rotor assembly 42 powered by one or more engines via a main rotor gearbox. Main rotor assembly 42 includes a plurality of rotor blade assemblies 44 extending radially outward from a main rotor hub. Main rotor assembly 42 is coupled to a fuselage 46 and is rotatable relative thereto. The pitch of rotor blade assemblies 44 can be collectively and/or cyclically manipulated to selectively control direction, thrust and lift of helicopter 40. A tailboom 48 extends from fuselage 46 in the aft direction. An anti-torque system 50 includes a tail rotor 52 that is rotatably coupled to the aft portion of tailboom 48. Anti-torque system 50 controls the yaw of helicopter 40. Helicopter 40 includes a landing gear system including a forward landing gear 54a and a pair of aft landing gear 54b each including an on-the-ground detection system having a strain gauge load sensor of the present disclosure. Each of the on-the-ground detection systems is preferably linked to a flight control system 56 that executes control logic to provide commands to operate the fly-by-wire control system of helicopter 40. As the control logic used during flight is different from the control logic used when helicopter 40 is on the ground, the on-the-ground detection systems incorporated into landing gear 54a, 54b provide an early indication of when helicopter 40 has transitioned from the air to the ground during landing maneuvers such that the proper control logic is executed by flight control system 56. Each of forward landing gear 54a and aft landing gear 54b is coupled to fuselage 46 and is rotatable relative thereto such that forward landing gear 54a and aft landing gear 54b can be retracted into fuselage 46 during flight.

Referring now to FIGS. 3A-3D of the drawings, a land gear that is representative of landing gear 28a, 28b, 54a, 54b is schematically illustrated and generally designated 100. In the illustrated embodiment, landing gear 100 includes a thru-piston shock strut depicted as having an outer cylinder 102 that defines a liquid chamber referred to herein as oil chamber 104 that contains a hydraulic fluid such as oil therein as indicated by wavy lines 106. Slidably and sealingly received within and extending through cylinder 102 is a piston 108 that defines a gas chamber referred to herein as air chamber or nitrogen chamber 110 that contains a gas such as air or nitrogen therein as indicated by stippling 112. Piston 108 also defines a liquid chamber referred to herein as oil chamber 114 that contains a hydraulic fluid such as oil therein as indicated by wavy lines 116. Fluid separation between nitrogen chamber 110 and oil chamber 114 is provided by a fluid separator 118 that is positioned between nitrogen chamber 110 and oil chamber 114. Fluid separator 118 is a floating separator that not only isolates the gas in nitrogen chamber 110 from the liquid in oil chamber 114 but also enables pressure balancing between nitrogen chamber 110 and oil chamber 114. Oil chamber 114 is in fluid communication with oil chamber 104 via an orifice 120 that regulates the flow of liquid therebetween.

In the illustrated embodiment, the lower portion of piston 108 extends through a lower end of cylinder 102 with the lower distal end of piston 108 coupled to a wheel assembly including an axle 122 and a wheel 124 that is rotatably coupled to axle 122. The upper portion of piston 108 extends through an upper end of cylinder 102 with the upper end of piston 108 coupled to a flange 126 that has a lower surface configured to hold piston 108 in the fully extended position relative to cylinder 102 that is referred to herein as extend stop surface 128 and that is external of cylinder 102. An on-the-ground detection system including a strain gauge load sensor 130 is disposed between an upper surface of cylinder 102 and extend stop surface 128 of piston 108. Load sensor 130 is preferably in communication with the aircraft's flight control system, such as flight control system 30 of aircraft 10 or flight control system 56 of helicopter 40, to provide an electrical signal indicative of the on-the-ground status of the aircraft including, for example, an electrical signal that provides an early indication of when the aircraft has transitioned from an in-the-air condition to an on-the-ground condition during a landing maneuver.

Figure 3A:
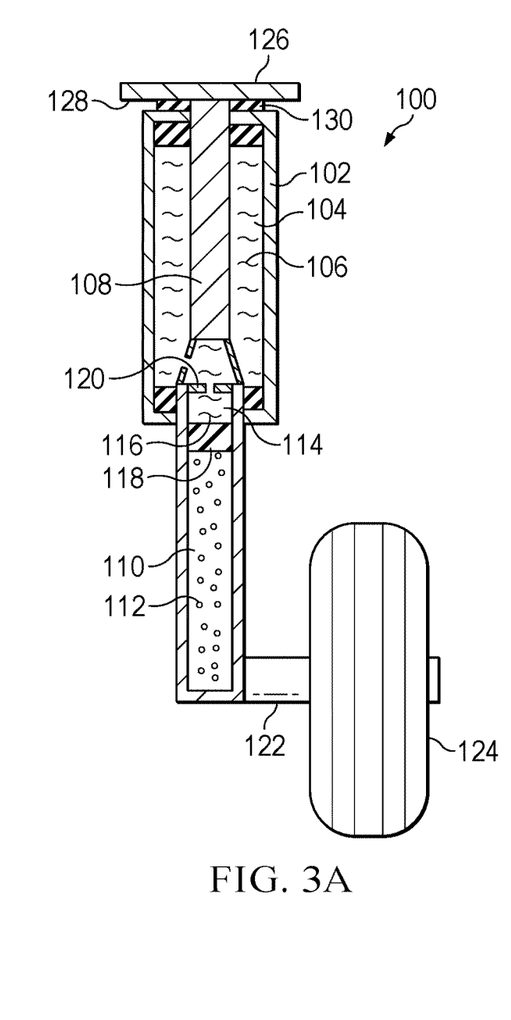
FIGS. 3A-3D are schematic illustrations of a landing gear with an on the ground detection system including a strain gauge load sensor in various operating configurations in accordance with embodiments of the present disclosure.

The operation of landing gear 100 will now be described. In FIG. 3A, landing gear 100 is in the fully extended position. Landing gear 100 would be in this position, for example, when the aircraft has deployed landing gear 100 during flight in preparation for a landing maneuver. In the illustrated embodiment, the pressure of the gas in nitrogen chamber 110 creates the force that causes piston 108 to be in the fully extended position relative to cylinder 102 with extend stop surface 128 preventing any further movement of piston 108 relative to cylinder 102. In this configuration, load sensor 130, which is disposed between an upper surface of cylinder 102 and extend stop surface 128 of piston 108, experiences a compressive force referred to herein as a preload force. The preload force is a result of the reaction force between piston 108 and cylinder 102 at extend stop surface 128 created by the gas pressure in nitrogen chamber 110 and the oil pressure in oil chambers 104, 114 which places piston 108 in tension. When wheel 124 contacts a landing surface 132, such as the ground, a landing force is exerted on wheel 124 by the landing surface 132. In response to the external landing force applied to wheel 124, landing gear 100 experiences a load balancing process that involves reduction in the tensile force in piston 108, an increase in the pressure in oil chamber 104 as piston 108 begins to move upwardly relative to cylinder 102 and an increase in the gas pressure in nitrogen chamber 110 as the liquid from oil chamber 104 enters oil chamber 114 through orifice 120.

Figure 3B:
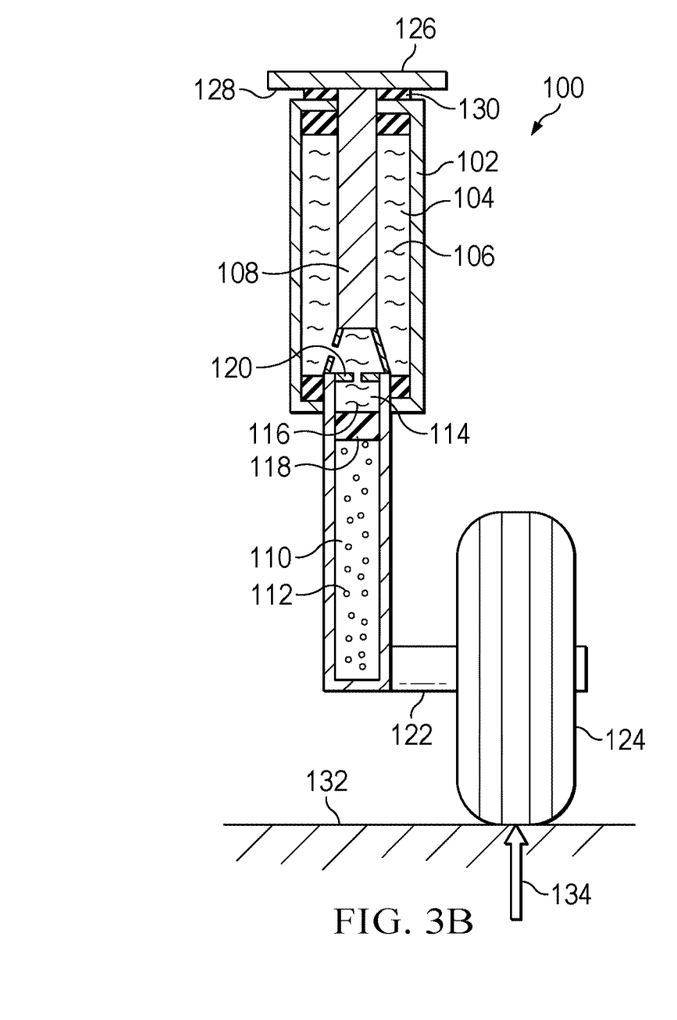
Figure 3C:
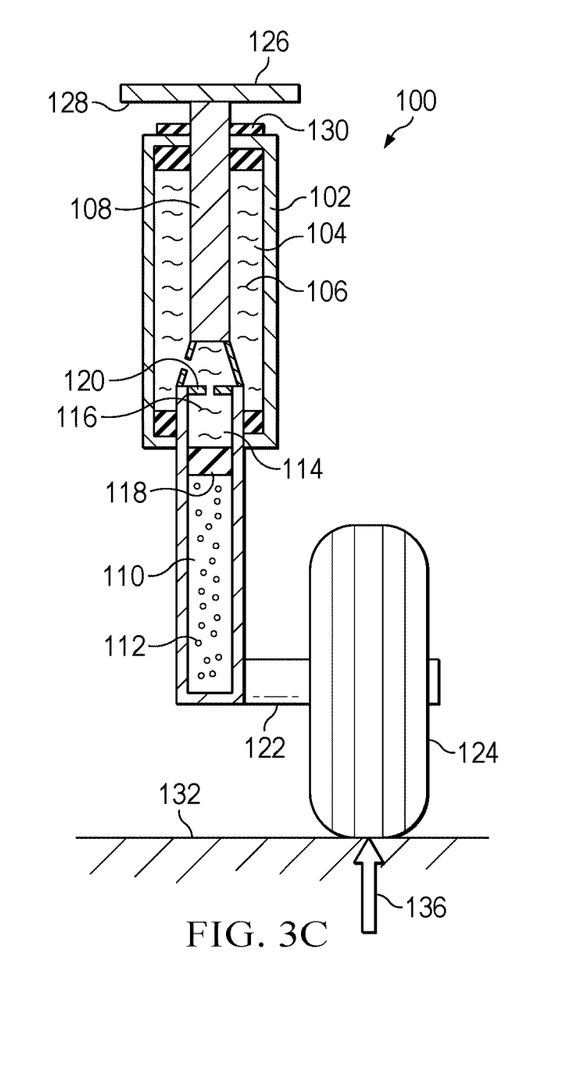
Figure 3D:
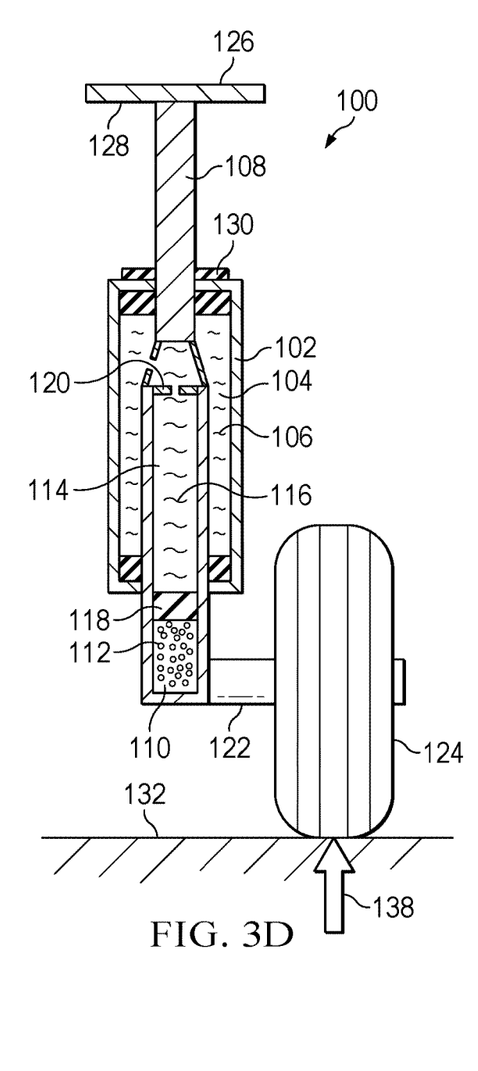

More specifically, FIG. 3B depicts a time period in which a landing force, as indicted by force arrow 134, is sufficient to reduce the tension in piston 108 but not yet sufficient to cause displacement of piston 108 relative to cylinder 102 due to the magnitude of landing force 134 and/or the duration of landing force 134, such as upon the initial contact between the aircraft and landing surface 132. FIG. 3C depicts a time period in which the landing force has increased as indicted by a larger force arrow 136, such as during the landing maneuver as more of the weight of the aircraft is supported by landing surface 132. In this time period, piston 108 is displaced relative to cylinder 102 causing an increase in the pressure in oil chamber 104. When the pressure in oil chamber 104 exceed that in oil chamber 114, liquid from oil chamber 104 passes through orifice 120 into oil chamber 114 which causes the volume of oil chamber 114 to increase and the volume of nitrogen chamber 110 to decrease, thereby further compressing the gas in nitrogen chamber 110 and increasing the pressure thereof. The rate at which liquid from oil chamber 104 passes through orifice 120 into oil chamber 114 is determined by the magnitude of landing force 136, the viscosity of the liquid, the size of orifice 120 and other factors known to those having ordinary skill in the art. FIG. 3D depicts a time period in which the force on wheel 124 represents the landed weight of the aircraft supported by landing gear 100, as indicted by a larger force arrow 138. In this time period, piston 108 is in a steady state condition, no longer displacing relative to cylinder 102, and the pressures in oil chamber 104, oil chamber 114 and nitrogen chamber 110 have equalized, thus completing the load balancing process.

Conventional weight on wheel sensors used to determine when the air-to-ground transition of a VTOL aircraft has taken place, such as limit switches or proximity switches, would typically provide an indication of the on-the-ground condition when landing gear 100 is in the position depicted in FIG. 3C, wherein significant displacement of piston 108 relative to cylinder 102 has occurred. It has been found, however, that in modern fly-by-wire VTOL aircraft, waiting until this significant displacement has occurred results in an undesirable delay in switching from the in-the-air control logic to the on-the-ground control logic. The present embodiments solve this problem by positioning load sensor 130 between an upper surface of cylinder 102 and extend stop surface 128 of piston 108 such that, in the fully extended position of landing gear 100, load sensor 130 experiences the preload force. In this unique configuration, when landing force 134 is sufficient to reduce the tension in piston 108, as best seen in FIG. 3B, load sensor 130 detects a reduction in the preload force at which time load sensor 130 can provide an electrical signal to the flight control system of the aircraft with an early indication that the aircraft has transitioned from an in-the-air condition to an on-the-ground condition, thereby enabling the flight control system to transition from the in-the-air control logic to the on-the-ground control logic in a more timely manner.

Figure 4:
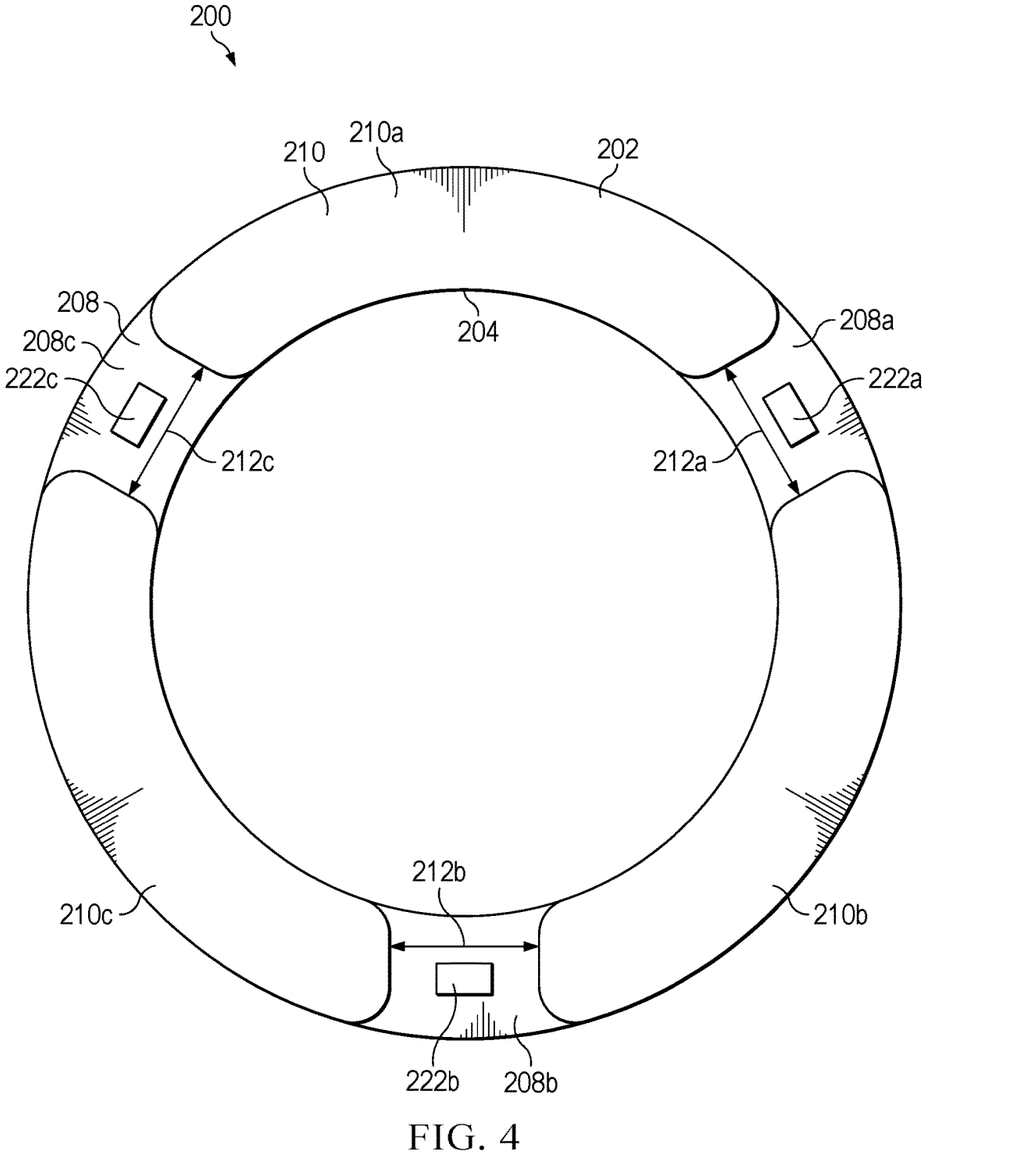
FIG. 4 is a top view of a strain gauge load sensor in accordance with embodiments of the present disclosure.

Referring additionally to FIG. 4 of the drawings, a strain gauge load sensor 200, which is representative of strain gauge load sensor 130, will now be described in greater detail. In the illustrated embodiment, load sensor 200 has a compressible annular body 202 that may be suitably sized to be positioned between an upper surface of cylinder 102 and extend stop surface 128 of piston 108, which are substantially parallel and planar surfaces, and configured to receive piston 108 therethrough. For example, load sensor 200 may be coupled to the upper surface of cylinder 102 such that piston 108 is slidable relative central opening 204. Alternatively, load sensor 200 could be coupled to piston 108 and be movable therewith relative to cylinder 102.

Figure 5A:
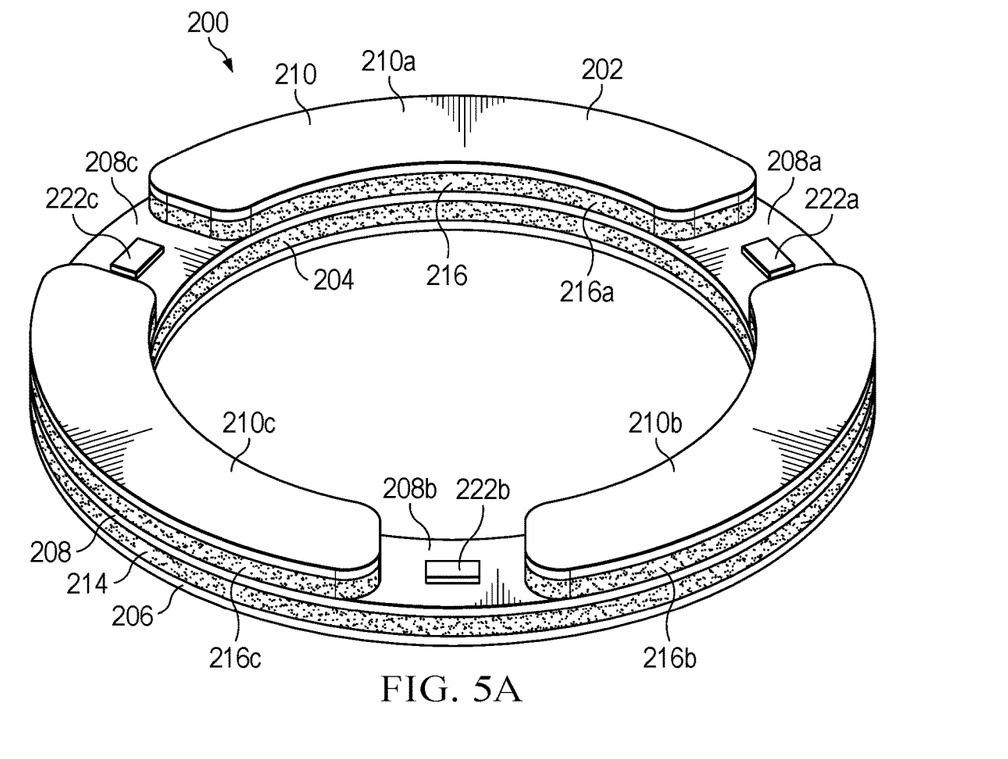
FIGS. 5A-5B are schematic illustrations of a strain gauge load sensor in uncompressed and compressed states in accordance with embodiments of the present disclosure.

Compressible annular body 202 is formed from a plurality of aligned layers depicted as a lower shim 206, a middle shim 208 and an upper shim 210, with lower shim 206 and upper shim 210 also referred to herein as outer shims 206, 210 (see also FIG. 5A). Shims 206, 208, 210 are formed from a substantially noncompressible material such as a metal including, for example, aluminum, alloy steel, stainless steel, or other suitable metallic material. In the illustrated embodiment, shims 206, 208, 210 share a common thickness. Alternatively, the thickness of one or more of shims 206, 208, 210 may be tailored for a particular application. For example, it may be desirable for middle shim 208 to have a different thickness than outer shims 206, 210, such as middle shim 208 being thicker or thinner than outer shims 206, 210. Similarly, while shims 206, 208, 210 may share a common material, such as stainless steel, shims 206, 208, 210 need not be of the same material. For example, middle shim 208 may be formed from a first material, such as a spring steel, while outer shims 206, 210 may be formed from a second material, such as a hardened steel. As discussed herein, middle shim 208 is subject to elastic deformation or bending during load sensing operations and is accordingly sized and formed to achieve the desired bending under the expected compressive loads. On the other hand, outer shims 206, 210 may be sized and formed to provide suitable strength and durability while maintaining a compact package design. In the illustrated embodiment, upper shim 210 is a segmented shim including shim sections 210a, 210b, 210c that discontinuously form upper shim 210 with a gap between shim sections 210a, 210b, indicated by arrow 212a, a gap between shim sections 210b, 210c, indicated by arrow 212b and a gap between shim sections 210c, 210a, indicated by arrow 212c. In the illustrated embodiment, the arc length of gaps 212a, 212b, 212c is between ten degrees and forty degrees such as between twenty degrees and thirty degree or about twenty-five degrees and will be tailored to achieve the desired bending of middle shim 208 under the expected compressive loads. In other embodiments, the arc length of gaps 212a, 212b, 212c may be less than ten degrees or greater than forty degrees.

In addition to lower shim 206, middle shim 208 and upper shim 210, compressible annular body 202 includes further aligned layers depicted as a resilient layer 214 interposed between the adjacent lower shim 206 and middle shim 208 as well as a resilient layer 216 interposed between the adjacent middle shim 208 and upper shim 210. Resilient layers 214, 216 are formed from a compressible material such as an elastomeric material. In the illustrated embodiment, resilient layers 214, 216 share a common thickness in an uncompressed state. Alternatively, the thicknesses resilient layers 214, 216 may be tailored for a particular application with, for example, the thickness resilient layer 214 being greater than or less than the thickness of resilient layer 216 in an uncompressed state. Resilient layer 214 is a continuous layer that is positioned and aligned between lower shim 206 and middle shim 208. Resilient layer 216 is a segmented resilient layer including resilient layer sections 216a, 216b, 216c that discontinuously form resilient layer 216 with a gap between resilient layer sections 216a, 216b, indicated by arrow 212a, a gap between resilient layer sections 216b, 216c, indicated by arrow 212b and a gap between resilient layer sections 216c, 216a, indicated by arrow 212c.

In this configuration, gaps 212a, 212b, 212c in upper shim 210 and resilient layer 216 expose selected areas of middle shim 208 that are referred to herein as unsupported areas 208a, 208b, 208c as these areas do not directly react the compressive forces applied to outer shims 206, 210 by, for example, the upper surface of cylinder 102 and extend stop surface 128 of piston 108. Instead, unsupported areas 208a, 208b, 208c of middle shim 208 tend to deflect away from outer shim 206 when compressible annular body 202 is in a compressed state between two surfaces. In the illustrated embodiment, gaps 212a, 212b, 212c have a gap width that is greater than the thickness 220 of compressible annular body 202, in the uncompressed state (see also FIG. 6A). For example, a ratio of the gap width to the body thickness in the uncompressed state is between 1 to 1 and 4 to 1 such as between 2 to 1 and 3 to 1 or about 2.5 to 1 and will be tailored to achieve the desired bending of middle shim 208 under the expected compressive loads. In other embodiments, the ratio of the gap width to the body thickness in the uncompressed state may be less than 1 to 1 or greater than 4 to 1. Each of the unsupported areas 208a, 208b, 208c of middle shim 208 has a respective strain gauge 222a, 222b, 222c coupled thereto by bonding or other suitable technique. More specifically, strain gauge 222a is positioned on middle shim 208 in the center of unsupported area 208a, strain gauge 222b is positioned on middle shim 208 in the center of unsupported area 208b and strain gauge 222c is positioned on middle shim 208 in the center of unsupported area 208c. By positioning strain gauges 222a, 222b, 222c in the middle of unsupported areas 208a, 208b, 208c, strain gauges 222a, 222b, 222c are subjected to maximum deformation when compressible annular body 202 is in a compressed state between two surfaces.

Strain gauges 222a, 222b, 222c may be electrically coupled to an aircraft's flight control system, such as flight control system 30 of aircraft 10 or flight control system 56 of helicopter 40, or coupled to another monitoring system that receives and interprets changes in electrical signals that are indicative of changes in the compressive force being applied to compressible annular body 202. More specifically, deformations in unsupported areas 208a, 208b, 208c of middle shim 208 that result from compressive forces being applied to compressible annular body 202 cause strain gauges 222a, 222b, 222c to change shape, which changes the electrical resistance of strain gauges 222a, 222b, 222c. These changes in electrical resistance can be measured as voltage changes that are proportional to the changes in the compressive force applied to compressible annular body 202. Due to the sensitivity of compressible annular body 202, and particularly the sensitivity of unsupported areas 208a, 208b, 208c of middle shim 208, strain gauges 222a, 222b, 222c respond to micro displacements such as those caused by the tensile force within piston 108 decreasing which enables, for example, the detection of a reduction in a preload force during load balancing of a landing gear.

Figure 5B:
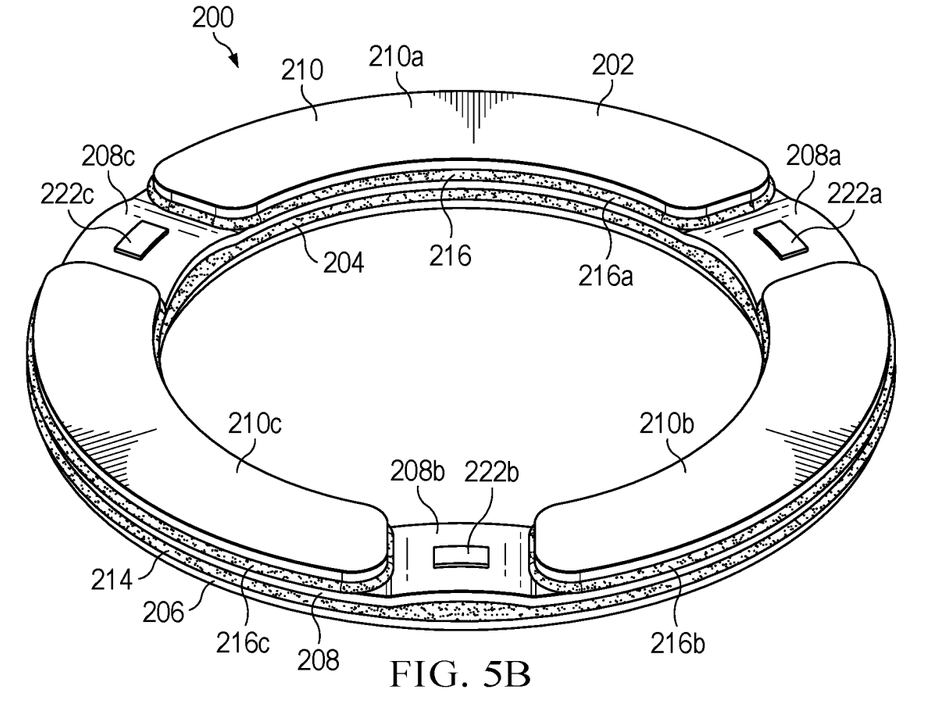
Figure 6A:
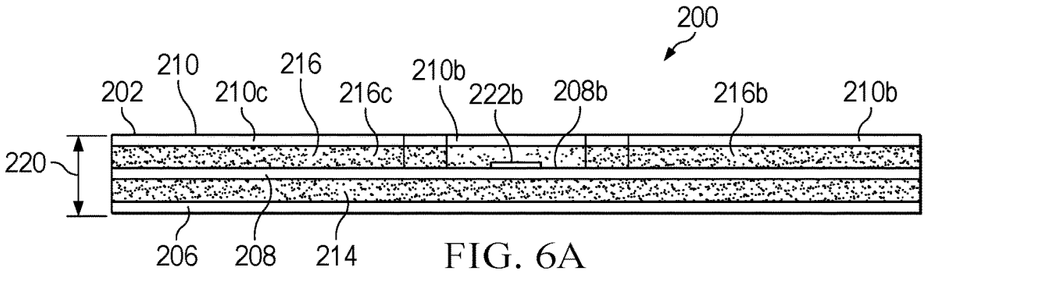
FIGS. 6A-6B are side views of a strain gauge load sensor in uncompressed and compressed states in accordance with embodiments of the present disclosure.

Referring additional to FIGS. 5A-5B and 6A-6B, additional details regarding load sensor 200 will now be described. When compressible annular body 202 is in an uncompressed state, as depicted in FIGS. 5A and 6A, resilient layer 214 interposed between lower shim 206 and middle shim 208 has a substantially uniform thickness. Likewise, resilient layer 216 interposed between middle shim 208 and upper shim 210 has a substantially uniform thickness. In the illustrated embodiment, the thickness of resilient layers 214, 216, in the uncompressed state, is greater than the thickness of shims 206, 208, 210. For example, a ratio of the resilient material thickness in the uncompressed state to the shim thickness is between 2 to 1 and 3 to 1 or about 2.5 to 1 and will be tailored to achieve the desired bending of middle shim 208 under the expected compressive loads. In other embodiments, the ratio of the resilient material thickness in the uncompressed state to the shim thickness could be less than 2 to 1 or greater than 3 to 1. In addition, due to the alignment of shims 206, 208, 210 and resilient layers 214, 216, the inner circumference of compressible annular body 202 is substantially flush. Likewise, due to the alignment of shims 206, 208, 210 and resilient layers 214, 216, the outer circumference of compressible annular body 202 is substantially flush.

Figure 6B:
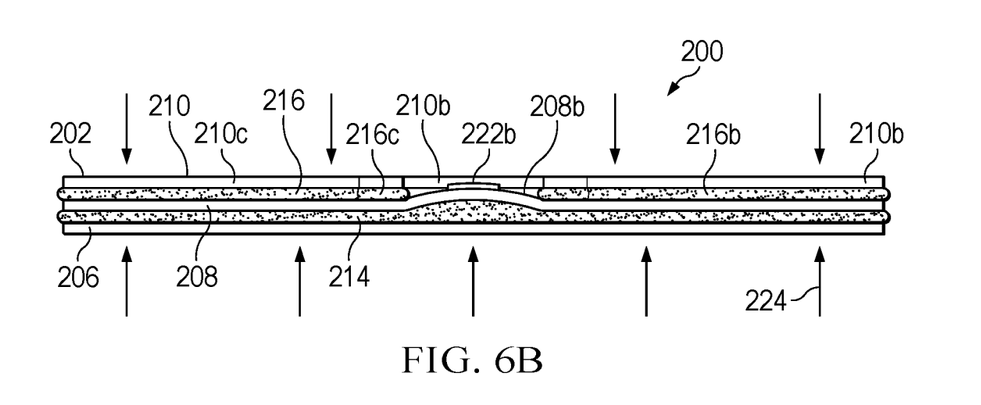

As depicted in FIGS. 5B and 6B, compressible annular body 202 is being compressed between two surfaces, represented by force arrows 224, that apply a compressive force on outer shims 206, 210. When compressible annular body 202 is in the compressed state, resilient layer 216 interposed between middle shim 208 and upper shim 210 has a substantially uniform thickness that is less than the substantially uniform thickness of resilient layer 216 in the uncompressed state. In addition, the compressive force causes resilient layer 216 to bulge radially inwardly beyond the inner circumference of shims 208, 210, radially outwardly beyond the outer circumference of shims 208, 210 and circumferentially beyond the ends of shim segments 210a, 210b, 210c. When compressible annular body 202 is in the compressed state, resilient layer 214 interposed between lower shim 206 and middle shim 208 has a substantially uniform thickness that is less than the substantially uniform thickness of resilient layer 214 in the uncompressed state in the supported areas of middle shim 208, which are the areas aligned under shim sections 210a, 210b, 210c. In the supported areas, the compressive force causes resilient layer 214 to bulge radially inwardly beyond the inner circumference of shims 206, 208 and radially outwardly beyond the outer circumference of shims 206, 208.

In unsupported areas 208a, 208b, 208c of middle shim 208, however, resilient layer 214 interposed between lower shim 206 and middle shim 208 has a nonuniform thickness. This nonuniform thickness is a result the progressive reduction in the compressive force being applied to resilient layer 214 from the outer portions of unsupported areas 208a, 208b, 208c to the center of unsupported areas 208a, 208b, 208c. For example, as best seen in FIG. 6B, at the center of unsupported area 208b, resilient layer 214 has been minimally compressed with little or no radial bulging of resilient layer 214. As lower shim 206 is fixed against a flat surface that is applying compressive force 224, this lack of compression and bulging of resilient layer 214 at the center of unsupported area 208b causes middle shim 208 to deform in the direction away from lower shim 206. This bending of middle shim 208 in unsupported area 208b causes deformation of strain gauge 222b which changes the electrical properties of strain gauge 222b. In the illustrated embodiment, the magnitude of compressive force 224 may be proportional to the deformation of unsupported areas 208a, 208b, 208c and thus the deformation of strain gauges 222a, 222b, 222c. The changes in the electrical signals from strain gauges 222a, 222b, 222c, which can be reported as voltage changes, are proportional to the changes in the compressive force applied to load sensor 200. In this manner, load sensor 200 is operable to detect changes in a compressive force applied thereto by two surfaces such that, for example, a reduction in a preload force in a landing gear can be detected to provide an early indication that an aircraft has transitioned from an in-the-air condition to an on-the-ground condition.

Figure 7:
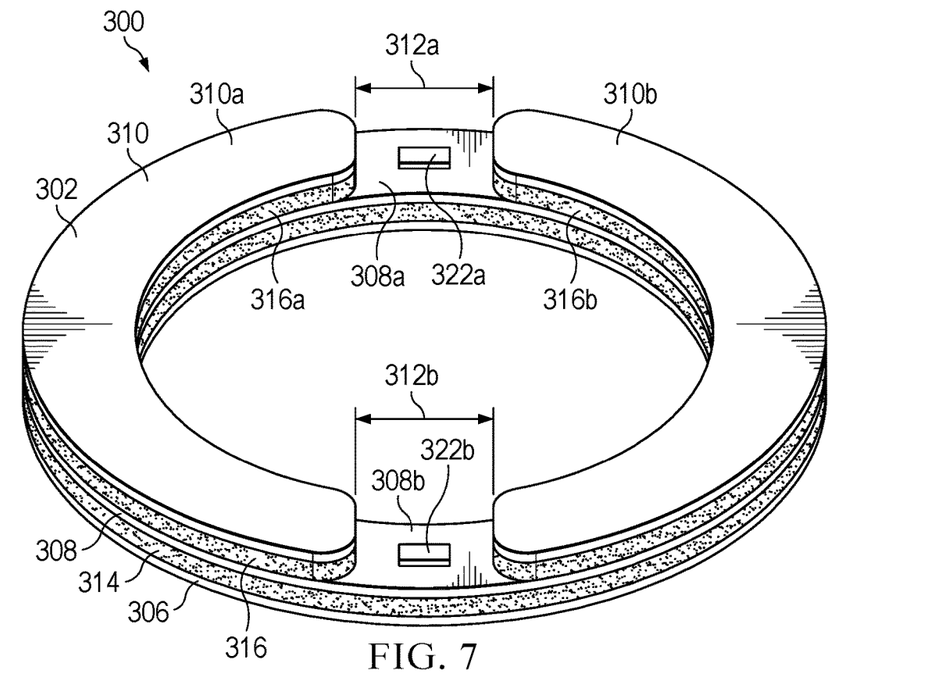
FIG. 7 is a top view of a strain gauge load sensor in accordance with embodiments of the present disclosure.

Even though load sensor 200 has been described and depicted as having three unsupported areas and three strain gauges, it should be understood by those having ordinary skill in the art that a load sensor of the present disclosure could have other numbers of unsupported areas and other numbers of strain gauges both greater than or less than three. For example, as best seen in FIG. 7, a load sensor 300 has a compressible annular body 302 formed from a plurality of aligned layers depicted as a continuous lower shim 306, a continuous middle shim 308 and a segmented upper shim 310 including shim sections 310a, 310b that discontinuously form upper shim 310 with gaps between shim sections 310a, 310b, indicated by arrows 312a and 312b. A resilient layer 314 is interposed between the adjacent lower shim 306 and middle shim 308 and a resilient layer 316 is interposed between the adjacent middle shim 308 and upper shim 310. Resilient layer 314 is a continuous layer that is positioned and aligned between lower shim 306 and middle shim 308. Resilient layer 316 is a segmented resilient layer including resilient layer sections 316a, 316b that discontinuously form resilient layer 316 with gaps between resilient layer sections 316a, 316b indicated by arrows 312a, 312b. In this configuration, gaps 312a, 312b in upper shim 310 and resilient layer 316 expose unsupported areas 308a, 308b of middle shim 308. Each of the unsupported areas 308a, 308b of middle shim 308 has a strain gauge 322a, 322b coupled thereto by bonding or other suitable technique with strain gauge 322a positioned on middle shim 308 in the center of unsupported area 308a and strain gauge 322b positioned on middle shim 308 in the center of unsupported area 308b. Deformations in unsupported areas 308a, 308b of middle shim 308 that result from compressive forces being applied to compressible annular body 302 cause strain gauges 322a, 322b to change shape, which changes the electrical resistance of strain gauges 322a, 322b. These changes in electrical resistance can be measured as voltage changes that are proportional to the changes in the compressive force applied to compressible annular body 302.

Figure 8:
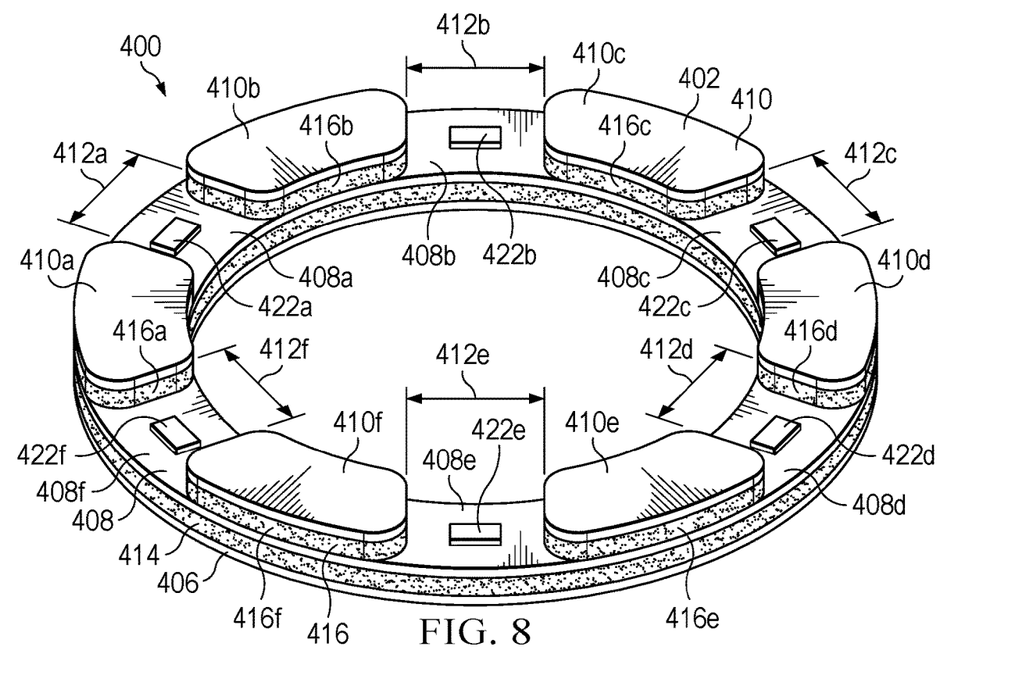
FIG. 8 is a top view of a strain gauge load sensor in accordance with embodiments of the present disclosure.

In another example, as best seen in FIG. 8, a load sensor 400 has a compressible annular body 402 formed from a plurality of aligned layers depicted as a continuous lower shim 406, a continuous middle shim 408 and a segmented upper shim 410 including shim sections 410a, 410b, 410c, 410d, 410e, 410f that discontinuously form upper shim 410 with gaps therebetween respectively indicated by arrows 412a, 412b, 412c, 412d, 412e, 412f. A resilient layer 414 is interposed between the adjacent lower shim 406 and middle shim 408 and a resilient layer 416 is interposed between the adjacent middle shim 408 and upper shim 410. Resilient layer 414 is a continuous layer that is positioned and aligned between lower shim 406 and middle shim 408. Resilient layer 416 is a segmented resilient layer including resilient layer sections 416a, 416b, 416c, 416d, 416e, 416f that discontinuously form resilient layer 416 with gaps therebetween respectively indicated by arrows 412a, 412b, 412c, 412d, 412e, 412f. In this configuration, gaps 412a, 412b, 412c, 412d, 412e, 412f in upper shim 410 and resilient layer 416 expose unsupported areas 408a, 408b, 408c, 408d, 408e, 408f of middle shim 408. Each of the unsupported areas 408a, 408b, 408c, 408d, 408e, 408f of middle shim 408 has a strain gauge 422a, 422b, 422c, 422d, 422e, 422f coupled thereto by bonding or other suitable technique with each strain gauge 422a, 422b, 422c, 422d, 422e, 422f positioned on middle shim 408 in the center of the respective unsupported area 408a, 408b, 408c, 408d, 408e, 408f. Deformations in unsupported areas 408a, 408b, 408c, 408d, 408e, 408f of middle shim 408 that result from compressive forces being applied to compressible annular body 402 cause strain gauges 422a, 422b, 422c, 422d, 422e, 422f to change shape, which changes the electrical resistance of strain gauges 422a, 422b, 422c, 422d, 422e, 422f. These changes in electrical resistance can be measured as voltage changes that are proportional to the changes in the compressive force applied to compressible annular body 402.

Figure 9:
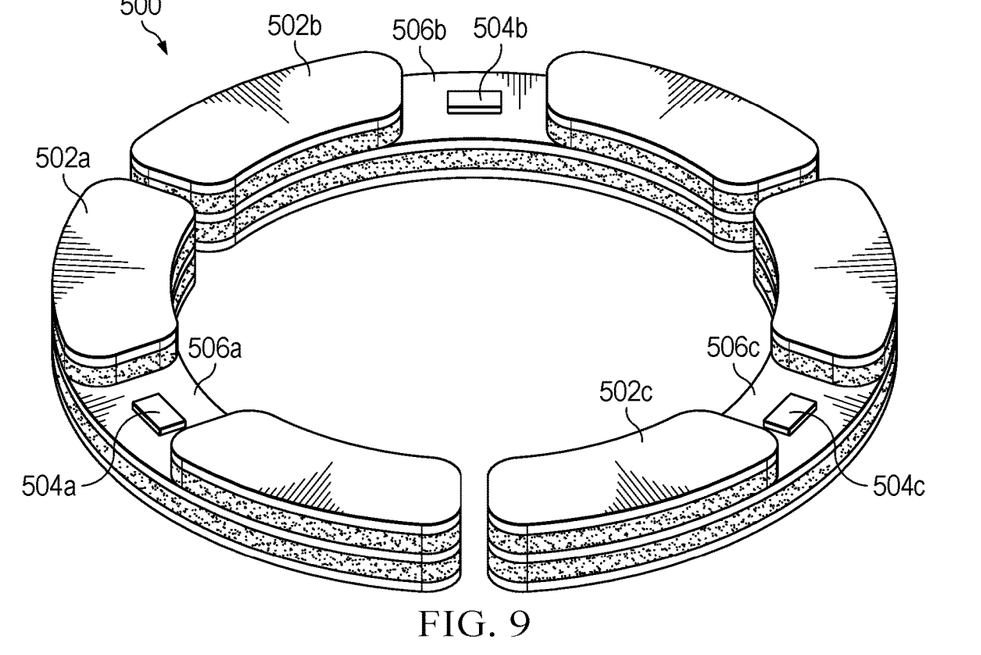
FIG. 9 is a top view of a strain gauge load sensor in accordance with embodiments of the present disclosure.

Even though load sensors 130, 200, 300, 400 has been described and depicted as having a compressible annular body, it should be understood by those having ordinary skill in the art that a load sensor of the present disclosure could have other shapes or configurations. For example, as best seen in FIG. 9, a load sensor 500 includes three compressible arcuate bodies 502a, 502b, 502c that can be used together to form a substantially annular load sensor or could be use individually or in other configuration in load sensing operations. Each compressible arcuate body 502a, 502b, 502c includes a plurality of aligned layers depicted as a continuous lower shim, a continuous middle shim and a segmented upper shim with a continuous resilient layer interposed between the adjacent lower shim and middle shim, and with a segmented resilient layer interposed between the adjacent middle shim and upper shim. Each compressible arcuate body 502a, 502b, 502c includes a respective strain gauge 504a, 504b, 504c that is positioned on the middle shim in the center of a respective unsupported area 506a, 506b, 506c. Deformations in unsupported areas 506a, 506b, 506c of the middle shims that result from compressive forces being applied to compressible arcuate bodies 502a, 502b, 502c cause strain gauges 504a, 504b, 504c to change shape, which changes the electrical resistance of strain gauges 504a, 504b, 504c. These changes in electrical resistance can be measured as voltage changes that are proportional to the changes in the compressive force applied to compressible arcuate bodies 502a, 502b, 502c.

Figure 10:
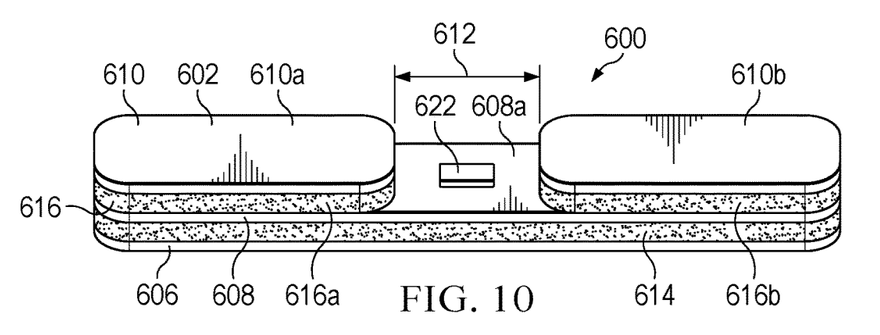
FIG. 10 is a top view of a strain gauge load sensor in accordance with embodiments of the present disclosure.

In another example, as best seen in FIG. 10, a load sensor 600 has a compressible linear body 602 formed from a plurality of aligned layers depicted as a continuous lower shim 606, a continuous middle shim 608 and a segmented upper shim 610 including shim sections 610a, 610b that discontinuously form upper shim 610 with a gap 612 therebetween. A continuous resilient layer 614 is interposed between the adjacent lower shim 606 and middle shim 608 and a segmented resilient layer 616, including resilient layer sections 616a, 616b, is interposed between the adjacent middle shim 608 and upper shim 610. In this configuration, gap 612 in upper shim 610 and resilient layer 616 expose unsupported area 608a of middle shim 608. Strain gauge 622 is positioned on middle shim 608 in the center of unsupported area 608a. Deformations in unsupported area 608a of middle shim 608 that result from compressive forces being applied to compressible linear body 602 cause strain gauge 622 to change shape, which changes the electrical resistance of strain gauge 622. These changes in electrical resistance can be measured as voltage changes that are proportional to the changes in the compressive force applied to compressible linear body 602.

Figure 11:
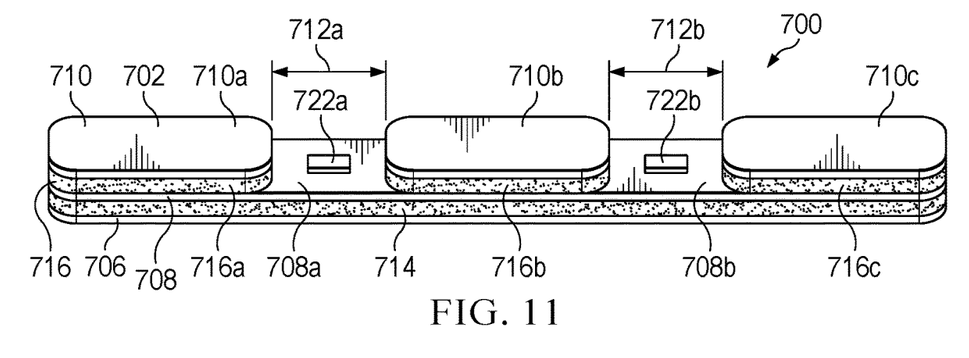
FIG. 11 is a top view of a strain gauge load sensor in accordance with embodiments of the present disclosure.

In a further example, as best seen in FIG. 11, a load sensor 700 has a compressible linear body 702 formed from a plurality of aligned layers depicted as a continuous lower shim 706, a continuous middle shim 708 and a segmented upper shim 710 including shim sections 710a, 710b, 710c that discontinuously form upper shim 710 with gaps 712a, 712b therebetween. A continuous resilient layer 714 is interposed between the adjacent lower shim 706 and middle shim 708 and a segmented resilient layer 716, including resilient layer sections 716a, 716b, 716c, is interposed between the adjacent middle shim 708 and upper shim 710. In this configuration, gaps 712a, 712b in upper shim 710 and resilient layer 716 expose unsupported areas 708a, 708b of middle shim 708. Strain gauges 722a, 722b are positioned on middle shim 708 in the center of the respective unsupported area 708a, 708b. Deformations in unsupported areas 708a, 708b of middle shim 708 that result from compressive forces being applied to compressible linear body 702 cause strain gauges 722a, 722b to change shape, which changes the electrical resistance of strain gauges 722a, 722b. These changes in electrical resistance can be measured as voltage changes that are proportional to the changes in the compressive force applied to compressible linear body 702.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. A load sensor for measuring compressive forces between two surfaces, the load sensor comprising:
    a compressible body positionable between the two surfaces, the compressible body having a plurality of aligned layers including first and second outer shims with a middle shim positioned therebetween and with a resilient material interposed between each adjacent shim, the second outer shim having a gap that exposes an unsupported area of the middle shim; and
    a strain gauge coupled to the middle shim in the unsupported area;
    wherein, when the compressible body is in an uncompressed state, the resilient material interposed between the first outer shim and the middle shim has a substantially uniform thickness; and
    wherein, when the compressible body is in a compressed state between the two surfaces, the resilient material aligned with the unsupported area and interposed between the first outer shim and the middle shim has a nonuniform thickness such that the middle shim deflects away from the first outer shim in the unsupported area, thereby deforming the strain gauge.

2. The load sensor as recited in claim 1 wherein, the two surfaces are substantially parallel and planar surfaces.

3. The load sensor as recited in claim 1 wherein, the compressible body is an annular body.

4. The load sensor as recited in claim 1 wherein, the compressible body is an arcuate body.

5. The load sensor as recited in claim 1 wherein, the compressible body is a linear body.

6. The load sensor as recited in claim 1 wherein, each of the shims is substantially noncompressible.

7. The load sensor as recited in claim 1 wherein, each of the shims is a metallic shim.

8. The load sensor as recited in claim 1 wherein, the resilient material is a compressible material.

9. The load sensor as recited in claim 1 wherein, the resilient material is an elastomeric material.

10. The load sensor as recited in claim 1 wherein, the gap has a gap width and the compressible body has a body thickness in the uncompressed state; and
    wherein, the gap width is greater than the body thickness.

11. The load sensor as recited in claim 1 wherein, the gap has a gap width and the compressible body has a body thickness in the uncompressed state; and
    wherein, a ratio of the gap width to the body thickness is between 1 to 1 and 4 to 1.

12. The load sensor as recited in claim 1 wherein, each of the shims has a common thickness.

13. The load sensor as recited in claim 1 wherein, a thickness of the middle shim is different from a thickness of the first and second outer shims.

14. The load sensor as recited in claim 1 wherein, a thickness of the middle shim is less than a thickness of the first and second outer shims.

15. The load sensor as recited in claim 1 wherein, each of the shims has a shim thickness and the resilient material interposed between each adjacent shim has a resilient material thickness in the uncompressed state; and
    wherein, the resilient material thickness is greater than the shim thickness.

16. The load sensor as recited in claim 1 wherein, each of the shims has a shim thickness and the resilient material interposed between each adjacent shim has a resilient material thickness in the uncompressed state; and
    wherein, a ratio of the resilient material thickness in the uncompressed state to the shim thickness is between 2 to 1 and 3 to 1.

17. A load sensor for measuring compressive forces between two surfaces, the load sensor comprising:
    a compressible annular body positionable between the two surfaces, the compressible annular body having a plurality of aligned layers including first and second outer metallic shims with a middle metallic shim positioned therebetween and with an elastomeric material interposed between each adjacent shim, the second outer metallic shim having a gap that exposes an unsupported area of the middle metallic shim; and
    a strain gauge coupled to the middle metallic shim in the unsupported area;
    wherein, when the compressible annular body is in an uncompressed state, the elastomeric material interposed between the first outer metallic shim and the middle metallic shim has a substantially uniform thickness; and
    wherein, when the compressible annular body is in a compressed state between the two surfaces, the elastomeric material aligned with the unsupported area and interposed between the first outer metallic shim and the middle metallic shim has a nonuniform thickness such that the middle metallic shim deflects away from the first outer metallic shim in the unsupported area, thereby deforming the strain gauge.

18. A load sensor for measuring compressive forces between two surfaces, the load sensor comprising:

a compressible annular body positionable between the two surfaces, the compressible annular body having a plurality of aligned layers including first and second outer metallic shims with a middle metallic shim positioned therebetween and with an elastomeric material interposed between each adjacent shim, the second outer metallic shim having a plurality of gaps that expose a plurality of unsupported areas of the middle metallic shim; and a plurality of strain gauges each coupled to the middle metallic shim in one of the unsupported areas;

wherein, when the compressible annular body is in an uncompressed state, the elastomeric material interposed between the first outer metallic shim and the middle metallic shim has a substantially uniform thickness; and wherein, when the compressible annular body is in a compressed state between the two surfaces, the elastomeric material aligned with each of the unsupported areas and interposed between the first outer metallic shim and the middle metallic shim has a nonuniform thickness such that the middle metallic shim deflects away from the first outer metallic shim in the unsupported areas, thereby deforming the strain gauges.

19. The load sensor as recited in claim 18 wherein, the plurality of unsupported areas is three unsupported areas and the plurality of strain gauges is three strain gauges.

20. The load sensor as recited in claim 19 wherein, the strain gauges are uniformly distributed about the compressible annular body at approximately 120 degree intervals.

* * * * *